United States Patent [19]

Taylor

[11] Patent Number: 5,413,280
[45] Date of Patent: May 9, 1995

[54] APPARATUS AND METHOD FOR DISSOLVING AND DISPENSING SOLUBLE COMPOUNDS

[76] Inventor: William S. Taylor, 16014 Rustic Sands, Houston, Tex. 77084

[21] Appl. No.: 124,350

[22] Filed: Sep. 20, 1993

Related U.S. Application Data

[63] Continuation-in-part of Ser. No. 122,219, Sep. 17, 1993, abandoned, which is a continuation-in-part of Ser. No. 13,690, Feb. 4, 1993, abandoned, which is a continuation-in-part of Ser. No. 504, Oct. 16, 1992, Pat. No. Des. 350,383.

[51] Int. Cl.$^6$ .............................................. B05B 7/30
[52] U.S. Cl. ...................................... 239/10; 239/310
[58] Field of Search .................. 239/310, 10, 318, 434

[56] References Cited

U.S. PATENT DOCUMENTS

| | | | |
|---|---|---|---|
| 1,964,576 | 6/1934 | Horne | 299/84 |
| 2,057,785 | 10/1936 | Milburn | 299/83 |
| 2,302,799 | 11/1942 | Peterson | 299/84 |
| 2,589,595 | 3/1952 | Aske | 299/84 |
| 2,606,068 | 8/1952 | Bonacor | 299/84 |
| 3,194,444 | 7/1965 | Hubert | 222/193 |
| 3,260,464 | 7/1966 | Harant | 239/318 |
| 3,351,290 | 11/1967 | Baldwin | 239/276 |
| 3,797,708 | 3/1974 | Sypal | 222/193 |
| 3,864,090 | 2/1975 | Richards | 23/267 E |
| 3,870,471 | 3/1975 | Tepas, Jr. et al. | 23/267 E |
| 4,333,493 | 6/1982 | Beiswenger et al. | 239/310 X |
| 4,340,179 | 7/1982 | Knapp | 239/310 |
| 4,385,034 | 5/1983 | Gacer | 239/310 X |
| 4,823,829 | 4/1989 | Woods | 137/114 |
| 4,901,923 | 2/1990 | McRoskey et al. | 239/123 |
| 4,941,616 | 7/1990 | Liebler | 239/310 |
| 5,133,498 | 7/1992 | Sealy et al. | 239/68 |

OTHER PUBLICATIONS

Stern's Nurseries, Inc. Advertisement, "Miracle-Gro No-Clog Feeder", undated 1 page.
Stern's Nurseries, Inc. Advertisement, "Miracle-Gro No-Clog-2 Feeder", undated, 1 page.
Green Garden, Inc. Advertising brochure, "The Proven Program for a Growing Market", undated, 12 pages.
Green Garden, Inc. Advertising brochure, "Hose End Sprayers", undated, 4 pages.

*Primary Examiner*—Andres Kashnikow
*Assistant Examiner*—Kevin P. Weldon
*Attorney, Agent, or Firm*—Pravel, Hewitt, Kimball & Krieger

[57] ABSTRACT

A method and dispensing apparatus for dispensing a soluble compound into a liquid stream. The dispensing apparatus includes a base having an inlet end and an outlet end with a throughbore connecting said inlet end to said outlet end. The throughbore is of generally constant diameter and unobstructed. A container for housing the soluble compound includes an opening. The container is removably secured to the base by a threaded connection. The base includes inlet and outlet connectors to couple the inlet end of the throughbore to a conduit connected to a liquid source and the outlet end of the throughbore to a lawn sprinkler. The base has an entrance orifice and an exit orifice between the throughbore and the secured container. A stake is adapted to be attached to the base member to secure the apparatus to the ground. The entrance orifice is smaller in diameter than the exit orifice and is typically located upstream of the exit orifice.

16 Claims, 4 Drawing Sheets

APPARATUS AND METHOD FOR DISSOLVING AND DISPENSING SOLUBLE COMPOUNDS

This application is a continuation-in-part (CIP) of U.S. patent application Ser. No. 122,219, now abandoned for APPARATUS AND METHOD FOR DISSOLVING AND DISPENSING SOLUBLE COMPOUNDS, filed Sep. 17, 1993, which is a CIP of patent application Ser. No. 013,690, filed Feb. 4, 1993, now abandoned, which is a CIP of patent application Ser. No. 000,504, filed Oct. 16, 1992 now U.S. De. Pat. No. D350,383. The inventor listed in the present application is the sole named inventor in the above applications.

BACKGROUND OF THE INVENTION

1. Field of the Invention

The present invention relates to a dispenser for dissolving and dispensing a soluble compound from a container into a stream of liquid such as water.

2. Description of the Related Art

The key to beautiful, healthy lawns and gardens is the proper application of fertilizer. The fertilizing of garden plants and lawn grass has always presented a problem to homeowners because of the difficulty in evenly applying the proper amount of fertilizer to the plants or grass.

Typically, solid fertilizer in granular form is spread on the ground with a rotary spreader. The application of the solid fertilizer oftentimes results in an uneven distribution over the ground area, resulting in the burning of patches of the lawn or damage to the plants. Heavy rains will often carry the fertilizer off and it will be lost and wasted. The uneven spreading of solid fertilizer causes an oversupply of fertilizer being provided at certain places, which is harmful to the plant, and at other places, an insufficient amount of fertilizer is distributed which fails to properly nourish the plants.

More recently, a popular fertilizer apparatus is a hand-held sprayer which attaches to the end of a garden hose. A water soluble concentrate chemical fertilizer is placed in a canister of the sprayer. The garden hose is connected to a cap member having a throughbore extending therethrough. The throughbore has entrance and exit ends. The canister is attached to the bottom of the cap member. Typically, an inlet orifice and an outlet orifice provide fluid communication between the throughbore and the canister attached to the cap member. Water is supplied through the garden hose to the throughbore of the cap member. A portion of the water stream is allowed to flow directly through the throughbore and exit the cap member. The remaining portion of the water stream is diverted into the canister by a flow restriction device, such as a venturi plug, located in the throughbore between the inlet and outlet orifices. The water diverted into the canister through the inlet orifice dissolves the fertilizer. The canister fills with water dissolving all of the soluble fertilizer. The liquid fertilizer solution is then drawn out of the canister through the outlet orifice by the venturi effect into the stream of water passing directly through the throughbore. One such hand-held sprayer is the Miracle-Gro Lawn & Garden Feeder by Sterns Miracle-Gro Products, Inc. The main drawback to this type of apparatus and method is that it requires a gardener to manually wave the sprayer back and forth, thus increasing the opportunity for poor lawn coverage. Additionally, the manual hand-held sprayer apparatus is tedious for the person using the sprayer. Furthermore, the gardener is required to hold the sprayer during use which often times will be used during the hot summer months. An automatic-type "hands free" apparatus that reduces or eliminates the requirement of gardener participation is desirable.

It is generally known in the prior art to provide devices which attach to water sprinklers or delivery systems for adding desirable compounds to the water passing through the system. The compounds are not limited to fertilizers but may also include pesticides, detergents or other water soluble compounds.

The prior art devices typically utilize a container having a cap member which is connected to a hose or other conduit through which the water is delivered. The cap member has a throughbore through which the water travels on its way to the sprinkler. The container is adapted to contain the soluble compound to be dissolved in the water. A small orifice in the cap member fluidably connects the container to the throughbore. A venturi plug in the throughbore of the cap member downstream of the small orifice serves to backpressure the water upstream of the venturi plug. The venturi plug diverts a small portion of the water stream through the small orifice into the container to dissolve and mix with the soluble compound therein. Downstream of the venturi plug there typically is a large orifice connecting the throughbore with the container. As is well known in the art, the reduced fluid pressure at downstream side of the venturi plug draws liquid from the container through the large orifice and into the stream passing through the throughbore. The resulting mixture is then carried downstream to the sprinkler.

The above-mentioned prior art devices rely on the well-known venturi principles and thus teach an obstruction to the flow of water between the small orifice and the large orifice resulting in a pressure differential between the orifices. The obstructions shown in the prior art include a restricted throughbore between the small and large orifices. See, for example, U.S. Pat. Nos. 5,133,498; 4,941,616; 4,901,923; 4,385,034; 4,333,493; 3,260,464; 3,194,444; 2,302,799; and 1,964,576.

It has been found that the venturi-type devices result in a significant fluid pressure drop at the outlet end of the device. The reduced pressure delivered to the sprinkler reduces the effectiveness of the sprinkler. Thus, the sprinkler covers a reduced surface area and, depending on the type of sprinkler being used, may cause it not to function properly. Since there are several types of sprinklers which require various operating pressures, it is desirable to have a dispensing apparatus which minimizes the fluid pressure drop through the apparatus.

It is further desirable to have a dispensing apparatus for use with underground sprinkler systems, soaker hoses or sprinkler hoses. Soaker and sprinkler hoses are capped at one end. Soaker hoses are porous and allow water to ooze or seep through the hose along its entire length. Sprinkler hoses have pin holes along its length which allow the water to spray the surrounding area with a fine spray or mist.

A general problem encountered in conjunction with the prior art devices is the complexity of the devices and the resulting cost to manufacture such devices. It is desirable to have an apparatus for dissolving and dispensing soluble compounds which is simple to operate, inexpensive to manufacture, and having the versatility to be used with virtually any type of watering apparatus or system without detrimental effect.

SUMMARY OF THE PRESENT INVENTION

Briefly, the present invention is an apparatus for dissolving and dispensing water soluble compounds. The apparatus includes a container which contains water soluble fertilizer, plant food or other water soluble compounds and a base adapted to attach to an open end of the container. The base has an inlet connector which is adapted to attach to a water hose or similar conduit connected to a water source and an outlet connector which is adapted to attach to a soaker or sprinkler hose, or a tubing connected to a downstream lawn sprinkler or other flow restricting device. Preferably, the inlet and outlet connectors are connected by an axial, unobstructed throughbore. The base includes an entrance orifice and an exit orifice which provide fluid communication between the throughbore and the interior of the container.

In use, the base is positioned below the container which has been at least partially filled with the soluble compound. A water stream from a water source flows from the hose inlet through the throughbore and discharges from the apparatus through the hose outlet. A restriction to the free flow of the water, as for example a sprinkler located at the end of a hose section connected to the outlet connector, causes a water backpressure which is equally applied across both the entrance and exit orifices entering the container.

Initially, the water backpressure forces water to enter the container through both the entrance and exit orifices. The entering water jets partially fill the container with water and dissolve the soluble compound. As the container fills with water, the air in the container becomes pressurized by the rising level of water in the container. The compressed air and the head pressure of the column of liquid acting on the orifices forces the liquid out of the container through the exit orifice into the throughbore. The liquid entering the throughbore mixes with the water stream and flows downstream through the throughbore on to the sprinkler. As liquid exits the container through the exit orifice, water enters the container through the entrance orifice to maintain a constant pressure within the container.

BRIEF DESCRIPTION OF THE DRAWINGS

In order to more fully understand the drawings referred to in the detailed description of the present invention, a brief description of each drawing is presented, in which.

DETAILED DESCRIPTION OF THE INVENTION

Figure 1:
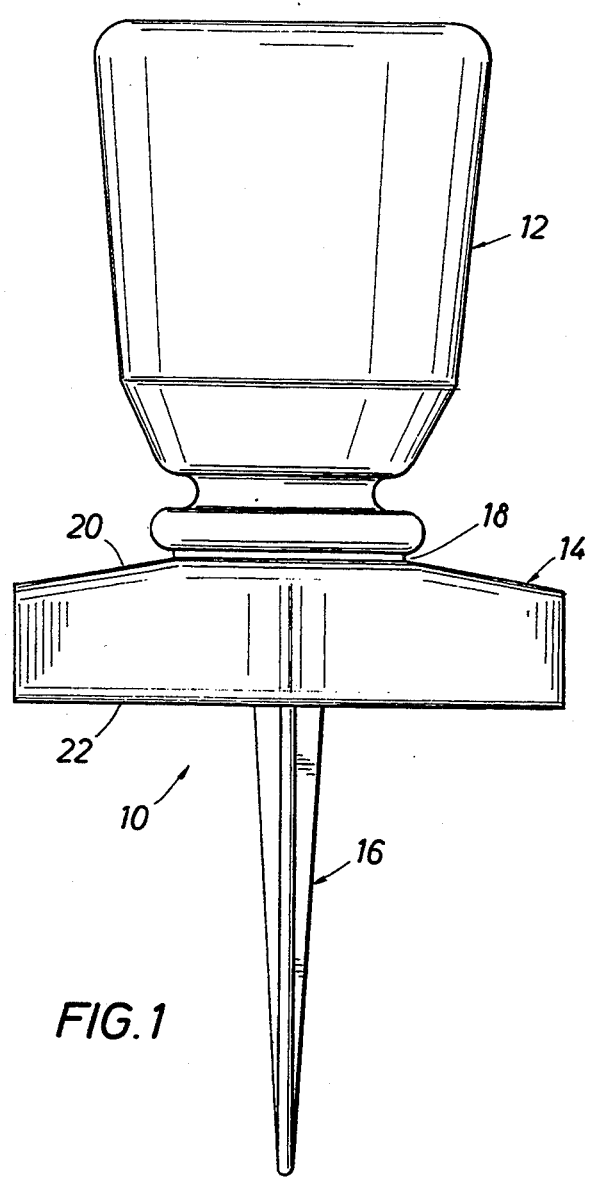
FIG. 1 is a front elevational view of the dispensing apparatus according to the present invention, the rear elevational view being a mirror image thereof.
Figure 2:
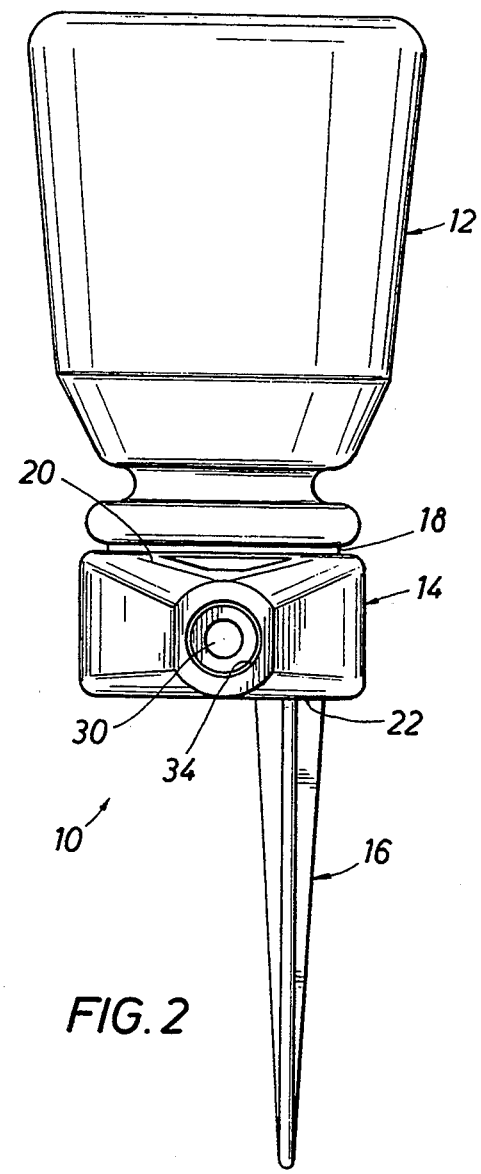
FIG. 2 is a side elevational view of the dispensing apparatus as shown in FIG. 1, the opposite side elevational view being a mirror image thereof.

Referring to FIGS. 1 and 2, the dispensing apparatus, generally designated as 10, includes an upper container 12, a base 14 and a spike 16. It is to be understood that the spike 16 is an optional feature which can be used to maintain the apparatus in an upright position as will be explained below.

In the preferred embodiment, the container 12 includes a mouth 18 provided with external threads (not shown) to removably secure the container 12 to the base 14. The container 12 is preferably a generally cylindrical receptacle having a single opening at the mouth 18. In the preferred embodiment of the present invention, the container 12 is made out of a polymeric material and is preferably transparent or translucent to allow visual checking of its contents.

Figure 5:
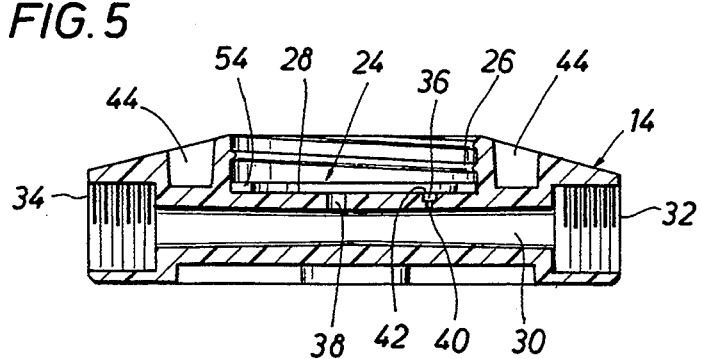
FIG. 5 is a view taken along lines 5—5 of FIG. 3.

With reference to FIGS. 1-5, the base 14 will now be described in detail. The base 14 is preferably molded of polyvinyl chloride (PVC) or some similar material. The base 14 includes an upper surface 20 and a lower surface 22. As shown in FIG. 5, the upper surface 20 includes a generally centrally located recessed area 24 having internal threads 26. The recessed area 24 terminates in a lower generally planar end surface 28. The internal threads 26 of the recessed area 24 are adapted to mate with the external threads (not shown) of the mouth 18 of the container 12. In use, the container 12 is threaded onto the base 14 until forming a sealed connection. Preferably, a flat seal 54 (FIG. 3 and 5) is placed between the mouth 18 of the container 12 and the end surface 28 of the base 14 to effectuate the sealed connection.

Figure 3:
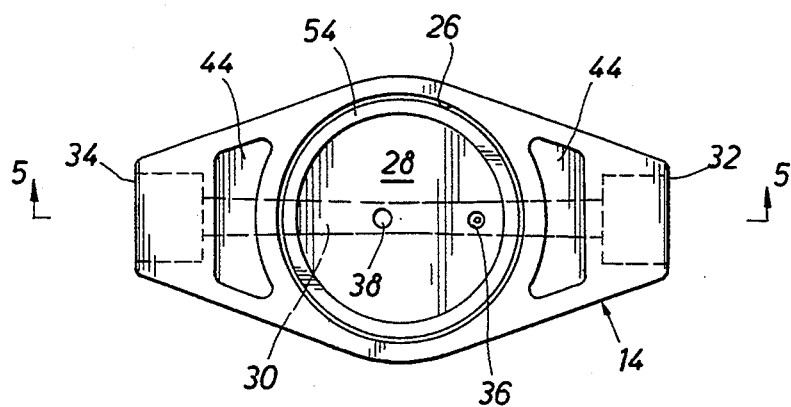
FIG. 3 is a top view of the base of the dispensing apparatus, the dashed lines indicating the throughbore of the dispensing apparatus.
Figure 4:
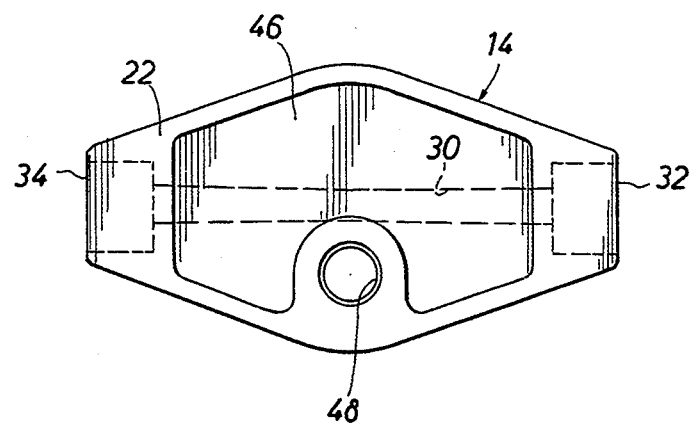
FIG. 4 is a bottom view of the base of the dispensing apparatus, the dashed lines indicating the throughbore of the dispensing apparatus.

Referring to FIGS. 3, 4 and 5, a tubular flow passage or throughbore 30 is formed in the base 14. The throughbore 30 is preferably circular is cross-section and includes an inlet connector 32 and an outlet connector 34. In the preferred embodiment, the inlet and outlet connectors 32 and 34 each comprise a threaded coupling. As shown in FIG. 5, the connectors 32 and 34 are female threaded hose couplings. It is to be understood that either or both of the connectors 32, 34 could alternatively be a male threaded hose coupling, a quick disconnect-type hose coupling or any other suitable end connector capable of connecting the throughbore 30 of the base 14 to a hose or other type of conduit.

Preferably, the throughbore 30 is an axial bore which is unobstructed and has a substantially uniform diameter between the inlet and outlet connectors 32 and 34, respectively, as shown in FIG. 5. The axial, unobstructed and substantially uniform diameter throughbore 30 minimizes any disruption to the flow of the water stream as it passes through the throughbore 30. This also minimizes the pressure loss occurring from having the dispensing apparatus 10 in the water supply line to the sprinkler.

It is to be understood that the throughbore 30 can be a constant diameter between the end connectors 32 and 34. The throughbore 30 has been shown in FIG. 5 as having a slightly decreasing diameter towards the center of the base 14. The slight decreasing change in diameter has been found to be desirable if the base 14 is being manufactured by the injection molding process.

Referring to FIGS. 3 and 5, an entrance orifice 36 and an exit orifice 38 in the base 14 provide fluid communication between the sealed container 12 secured to the base 14 and the throughbore 30. The entrance and exit orifices 36 and 38, respectively, provide fluid communication between the container 12 and the flow passageway 30.

As shown in FIGS. 3 and 5, the exit orifice 38 is preferably located downstream of the entrance orifice 36. The exit orifice 38 in the preferred embodiment is a generally cylindrical bore of uniform diameter. The entrance orifice 36 in the preferred embodiment includes a first entrance aperture 40 and a counter-bore 42. In the preferred embodiment, the entrance orifice 36, including both the first entrance aperture 40 and the counter-bore 42, has a smaller diameter than the exit orifice 38 for reasons which will be explained below.

Figure 11:
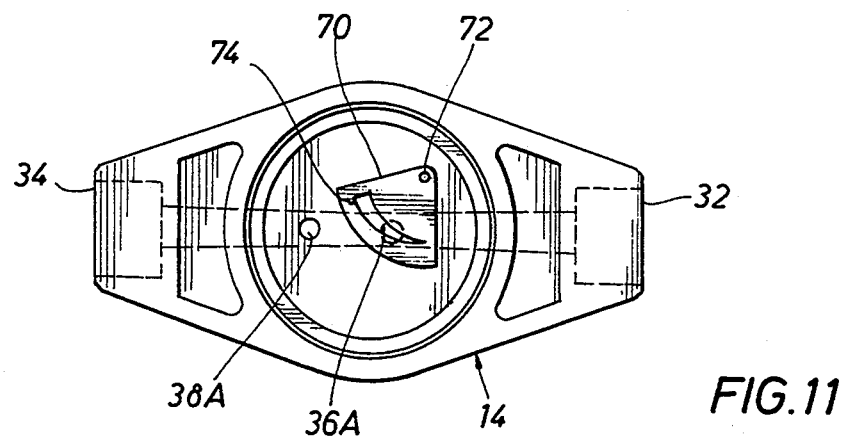
FIG. 11 is a top view of a modified base of the dispensing apparatus having an inlet orifice adjustment plate.

Referring to FIG. 11, the base 14 has been modified to include an inlet orifice adjustment plate 70 which pivots about a pinned connection 72. The adjustment plate 70 includes a gradually tapered slot 74 therethrough which is located above an inlet orifice 36A. The adjustment plate 70 can be rotated to adjust the open area of the inlet orifice 36A. An outlet orifice 38A is positioned downstream of the inlet orifice 36A. Preferably, the diameters of the inlet and outlet orifices 36A and 38A, respectively, are approximately equal for reasons which will be explained below.

It is to be understood that the dispensing apparatus 10 will also function when the outlet connector 34 of the base 14 is connected to the inlet hose from the water source and the inlet connector 32 is connected to the outlet hose and sprinkler. This is true even though the upstream orifice is now a larger hole than the downstream orifice. The effect of reversing the orientation of the base 14 will be explained in greater detail below.

Referring to FIGS. 3 and 5, the upper surface 20 of the base 14 includes a pair of recesses 44 which have been provided for the molding process and to minimize the material cost.

Figure 6:
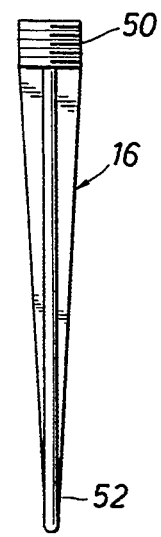
FIG. 6 is a side elevational view of a spike of the dispensing apparatus of the present invention.
Figure 7:
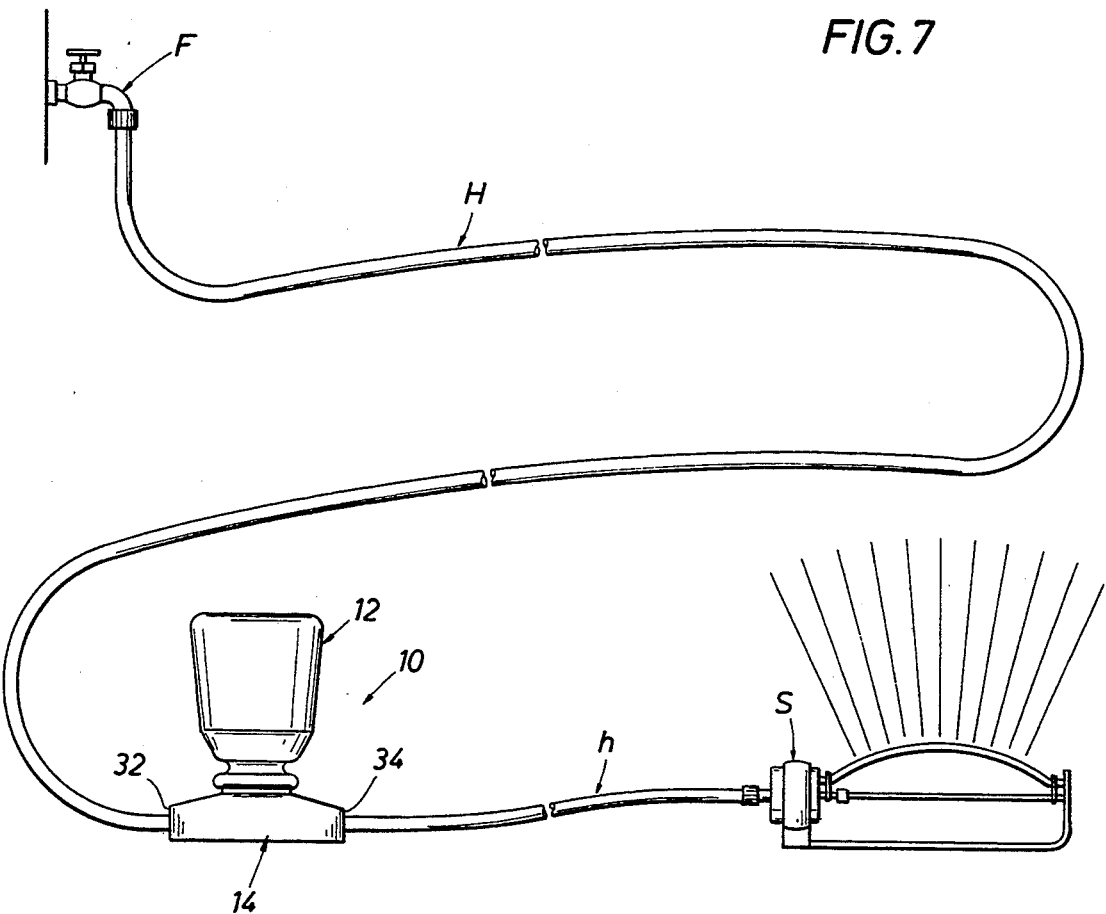
FIG. 7 is a view of the dispensing apparatus connected to hoses and a lawn sprinkler.

Referring to FIG. 4, the lower surface 22 of the base 14 includes a recess area 46 provided to minimize the material cost and facilitate the molding process of the base 14. The lower surface 22 includes an internal threaded portion 48 adapted to mate with external threads 50 provided on the upper portion of the spike 16 as shown in FIG. 6. The spike 16 is shown as having a pointed lower end 52 with outwardly tapering flanges extending to the external threads 50. It is to be understood that any other suitable attaching means may be used to removably secure the spike 16 to the base 14. The spike 16 is intended to be forced into the ground to ensure that the dispensing apparatus 10 remains in a generally upright position, as shown in FIGS. 1, 2 and 7, when being used. In some situations it may be desirable to use the dispensing apparatus 10 without the spike 16, as for example when the ground is very flat.

Figure 10:
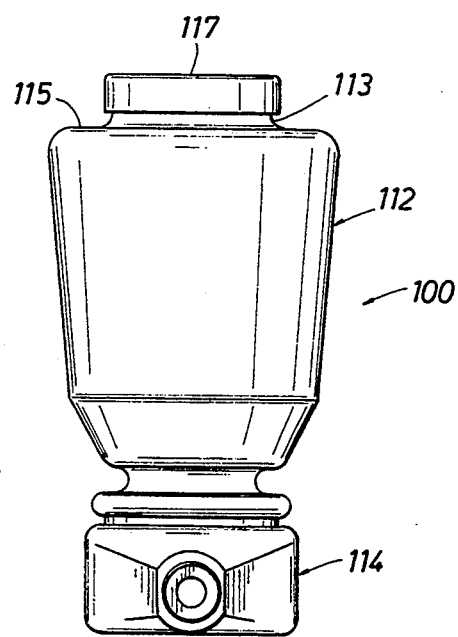
FIG. 10 is a side elevational view of an alternate embodiment of the dispensing apparatus according to the present invention.

In an alternate embodiment as shown in FIG. 10, the dispensing apparatus 100 includes a container 112 having an opening 113 at an end 115 opposite the base 114. The opening 113 is adapted to be securely sealed with a cap 117. The opening 113 is preferably sealed by the cap 117 with threaded means (not shown). In the alternate embodiment, it is possible to remove the cap 117 from the container 112 to add the soluble compound to container 112. This eliminates the need of removing the container 12 from the base 14 to add the soluble compound as required in the preferred embodiment.

It may also be desirable in the alternate embodiment to integrally form the container 112 with the base 114 to eliminate the sealed, threaded connection between the container 12 and the base 14 in the preferred embodiment.

It may also be desirable to add a backflow preventer (not shown) at the inlet connector 32 to prevent the liquid in the container 12 from flowing in the upstream direction when the water supply is shut off after use of the dispensing apparatus 10. Backflow preventers are commonly used in devices of this type. Preferably, the backflow preventer should minimally reduce the water pressure provided downstream of the backflow preventer.

OPERATION OF THE INVENTION

In operation, the container 12 of the preferred embodiment is at least partially filled with a soluble compound C (FIG. 8), as for example a concentrate crystalline fertilizer, with the container 12 unattached to the base 14. After filling the container 12 with the soluble compound C, the base 14 is threadably connected to the mouth 18 of the container 12.

If using the alternate embodiment, the cap 117 is removed from the container 112 so as to allow the container 112 to be at least partially filled with the soluble compound C. After filling the container 112 with the soluble compound C, the cap 117 is threadably connected to the opening 113 of the container 112.

Referring to FIG. 7, a garden hose H is connected to a water faucet F and to the inlet connector 32 of the base 14. A second garden hose h is connected to the outlet connector 34 of the base 14 and to a conventional lawn sprinkler S. The lawn sprinkler S is positioned at the desired location and the spike 16 of the dispensing apparatus 10 is vertically inserted into the ground. The water faucet F is opened and the stream of water enters the throughbore 30 at the inlet portion of the base 14 and discharges from the dispensing apparatus 10 through the outlet portion of the base 14.

Initially, the water stream continues on to the conventional lawn sprinkler S where it is sprinkled onto the desired yard area. The lawn sprinkler S provides a restriction to the free flow of the stream of water. The restriction to the free flow causes a water backpressure which is substantially equally applied across both the entrance and exit orifices 36 and 38, respectively, entering the container 12.

Figure 8:
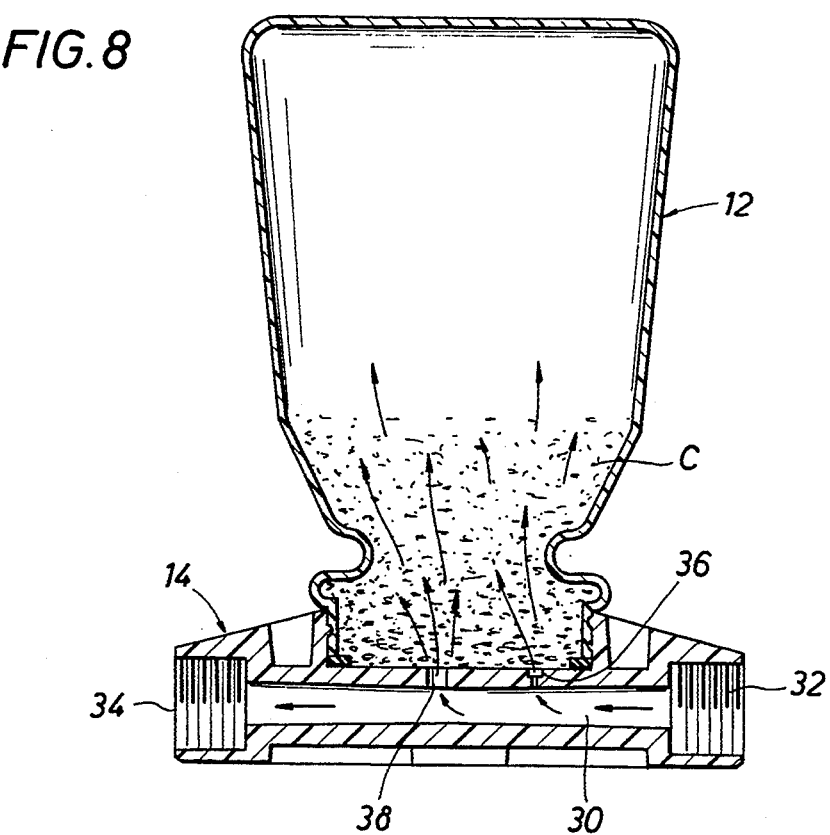
FIG. 8 is a front elevational cross-sectional view of the base and container showing the flow of water during the initial filling of the container with water, the inlet and outlet hoses and lawn sprinkler not shown.
Figure 9:
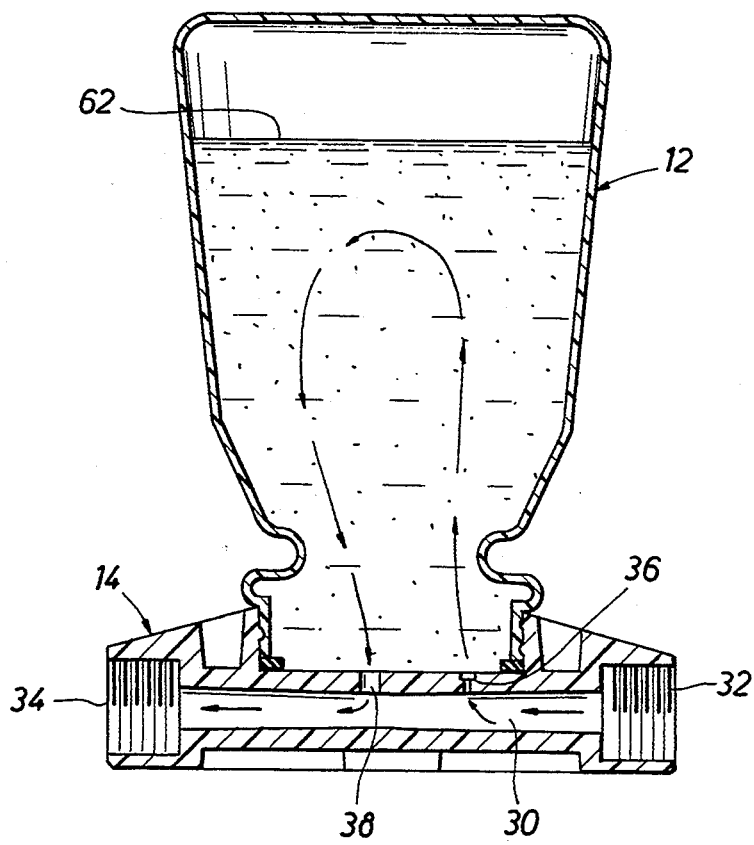
FIG. 9 is a view similar to FIG. 8 showing the flow of water after the initial filling of the container.

The water backpressure forces water to initially enter the container 12 through both the entrance and exit orifices 36 and 38, respectively, as shown by the arrows in FIG. 8. The entering water jets partially fill the container 12 with water and dissolve the soluble compound C. As the container 12 fills with water, the air in the container 12 becomes pressurized by the rising level 62 of water in the container 12. As shown in FIG. 9, the resulting compressed air and the head pressure of the column of liquid acting on the orifices 36 and 38 forces the liquid out of the container 12 through the exit orifice 38 into the throughbore 30. The liquid entering the throughbore 30 mixes with the water stream and flows downstream through the throughbore 30 on to the sprinkler S.

As liquid exits the container 12 through the exit orifice 38, water enters the container 12 through the entrance orifice 36 to maintain a substantially constant pressure within the container 12.

Typically, the soluble compound C includes a dye for color. Thus, when the soluble compound C is dissolved in water, the resulting liquid is colored. The transparency or translucency of the container 12 permits the gardener or user to visually check the appearance of the liquid inside the container 12. When the liquid becomes clear the soluble compound C has been fully dissolved and dispensed by the dispensing apparatus 10.

It is to be understood that little or no water is diverted into the container 12 when there is no flow restriction device, such as a sprinkler S, located downstream of the dispensing apparatus 12 since the water stream will flow unimpededly through the throughbore 30 of the base 12. This sets the dispensing apparatus 10 of the present invention apart from the devices of the prior art which divert water into the container 12 with a venturi plug positioned between the entrance and exit orifices 36 and 38, respectively. More importantly, as a result of the unique design of the unobstructed throughbore 30 and the pressurized container 12, the water pressure at the flow restriction device S downstream of the dispensing apparatus 10 is virtually unaffected by the insertion of the dispensing apparatus 10 in the watering system.

In practice, the inlet and outlet connectors 32 and 34 have a standard garden hose thread. The throughbore 30 has a 7/16" diameter. When the throughbore 30 is tapered for fabrication purposes, a one degree draft per side is desirable. The exit orifice 38 preferably has a diameter of 0.250". The first entrance aperture 40 preferably has a diameter of 0,040" with the counter-bore 42 having a diameter of 0,250".

The dispensing apparatus 10 can be reversibly connected to the water source such that the inlet orifice 36 is downstream of the outlet orifice 38 unless the dispensing apparatus 10 incorporates a backflow preventer. The reverse-connected dispensing apparatus 10 continues to operate and provides the same water pressure to the sprinkler S as in the normal orientation. Interestingly, once the pressure has stabilized in the container 12, the smaller inlet orifice 36 continues to supply water into the container 12 while the outlet orifice 38 allows the liquid to flow out of the container 12. Significantly, the only difference detected is that it takes a longer period of time for the dissolved compound to fully exit the dispensing apparatus 10. Thus, by reversing the orientation of the base 14, the gardener can select a slower rate of dispensing the soluble compound C onto the plants.

The dispensing apparatus 10 has been satisfactorily tested using various kinds of dry concentrate water soluble fertilizers and various types of sprinklers including oscillating sprinklers, pulsating impact sprinklers and non-movable ring sprinklers. Tests were conducted with water pressures ranging from approximately 40 to 60 psi. In all tests good performance characteristics were achieved. The fertilizers dissolved rapidly and completely and mixed with the out flowing water evenly to release the fertilizer solution. In tests using the dispensing apparatus 10 with a lawn sprinkler S, no clogging of the sprinkler orifices or other adverse effects on the spray rate or coverage of the sprinkler have been detected. The dispensing apparatus 10 can also be used to dispense the soluble compound C in underground sprinkler systems, and with soaker hoses or sprinkler hoses. The stabilizing pressure in the container 12 is dependent on the downstream flow restriction device S and the water pressure of the water source. For a given water source pressure, the greater the restriction provided by the flow restriction device the greater the stabilizing pressure in the container 12.

As indicated above, it has been found that the inclusion of the dispensing apparatus 10 of the present invention in a sprinkling system has extremely little or no effect on the water pressure delivered to the sprinkler S. The distance of water "thrown" or the surface area covered by the sprinkler S with the dispensing apparatus 10 in the system in comparison with the dispensing apparatus out of the system is virtually undetectable and unnoticeable. In several tests, the water pressure was measured with a pressure gauge located just before the sprinkler S with the dispensing apparatus 10 in line and upstream of the pressure gauge. The dispensing apparatus 10 was then removed from the system with no detectable change in the water pressure reading.

It has been found that the smaller of the inlet and outlet orifices 36 and 38, respectively, controls the rate of flow through the container 12. In the modified base 14 as shown in FIG. 11, the inlet orifice 36A is sized approximately the same as the outlet orifice 38A. Thus, for an increased rate of flow through the container 12 which shortens the time period to apply the soluble compound C and increases the applied concentration, the adjustment plate 70 is positioned such that the entire inlet orifice 36A is exposed through the tapered slot 74. For a decreased rate of flow through the container 12 which lengthens the time period to apply the soluble compound C and decreases the applied concentration, the adjustment plate 70 is positioned such that a reduced area of the inlet orifice 36A is exposed through the tapered slot 74. The size of the opening of the inlet orifice is believed to have an effect on the pressure of the air in the container 12. The air pressure in the container 12 increases as the size of the inlet orifice opening approaches the size of the larger outlet orifice. However, in all tests of the dispensing apparatus 10 the stabilized air pressure in the container 12 never exceeds the pressure downstream of the dispensing apparatus 10.

The dispensing apparatus 10 of the present invention is extremely simple to manufacture and operate. The simplicity of the apparatus 10 makes it cost efficient to manufacture. The dispensing apparatus 10 of the present invention is not restricted to applications for fertilizing plants and lawns. The dispensing apparatus 10 can also be used in other applications where it is desirable to dissolve a soluble compound C with a liquid stream prior to applying the mixture. One such use would be with a sprayer apparatus. The dispensing apparatus 10 can also be used to dispense a liquid as opposed to a dry soluble concentrate.

The foregoing disclosure and description of the invention is illustrative and explanatory thereof, and various changes in the size, shape, and materials, as well as in the details of illustrative construction and assembly, may be made without departing from the spirit of the invention.

I claim:

1. A method for dissolving and dispensing a soluble substance into a liquid stream being dispensed downstream through a flow restricting device, the method utilizing a container mounted to a base member having a throughbore and entrance and exit orifices providing fluid communication between the throughbore and the container, the method comprising the steps of:
- placing the soluble substance into the container;
- attaching the container to the base member;
- positioning the base member beneath the container;
- connecting the base member to a liquid source;
- connecting the flow restricting device downstream of the base member;
- providing a liquid stream to the throughbore of the base member; and
- pressurizing the container.

2. The method according to claim 1, wherein said step of pressurizing the container comprises the step of initially introducing the liquid into the container via the entrance and exit orifices.

3. The method according to claim 1, wherein the step of pressurizing the container comprises the step of applying substantially equal pressure to the entrance and exit orifices in fluid communication with the throughbore.

4. The method according to claim 3, wherein said step of pressurizing the container further comprises the step of initially pressurizing the container by introducing the liquid into the container via the entrance and exit orifices.

5. The method according to claim 4, further comprising the step of utilizing the hydrostatic pressure and the pressurized container to discharge the liquid from the container via the exit orifice.

6. A dispensing apparatus for dispensing a soluble compound into a flowing liquid stream, the dispensing apparatus comprising:
- a base member having a throughbore;
- a container having an opening adapted to receive a soluble compound, said container connected to said base member; and
- said base member includes a first orifice providing fluid communication between the throughbore and said container and a second orifice providing fluid communication between the throughbore and said container,
- wherein the first orifice is located in the throughbore upstream of the second orifice and the throughbore from a point upstream of the first orifice to a point downstream of the second orifice is unobstructed and has a substantially uniform diameter.

7. The apparatus according to claim 6, wherein the throughbore has an inlet end and an outlet end and the apparatus further comprises:
- first means for coupling the inlet end of the throughbore to a liquid source; and
- second means for coupling the outlet end of the throughbore to a flow restricting device.

8. The apparatus according to claim 7, wherein liquid from the liquid source initially enters said container by flowing into the throughbore and through the first and second orifices.

9. A dispensing apparatus for dispensing a soluble compound into a liquid stream, the dispensing apparatus comprising:
- a base member having a throughbore;
- a container having an opening adapted to receive a soluble compound, said container connected to said base member;
- said base member includes a first entrance orifice providing fluid communication between the throughbore and said container and a second exit orifice providing fluid communication between the throughbore and said container; and
- means for providing substantially equal liquid backpressures to the first entrance and second exit orifices.

10. The apparatus according to claim 9, wherein liquid from the liquid source initially enters said container by flowing into the throughbore and through the first entrance and second exit orifices.

11. The apparatus according to claim 10, wherein said means for providing substantially equal liquid backpressures comprises an unobstructed and substantially uniform diameter throughbore from the first entrance to the second exit orifices.

12. The apparatus according to claim 10, wherein said means for providing substantially equal liquid backpressures comprises an unobstructed and uniform diameter throughbore from the first entrance to the second exit orifices.

13. The apparatus according to claim 12, wherein the first entrance orifice is located in the throughbore upstream of the second exit orifice and the throughbore from a point upstream of the first entrance orifice to a point downstream of the second exit orifice is unobstructed and has a substantially uniform diameter.

14. A dispensing apparatus for dispensing a soluble compound into a liquid stream, the dispensing apparatus comprising:
- a container adapted to contain a soluble compound, said container having an opening;
- a base member connected to said container at the opening of said container and having a throughbore, the throughbore having an inlet end and an outlet end, said base member including an entrance orifice between the throughbore and said container and an exit orifice between the throughbore and said container, the throughbore having a constant diameter at and between the entrance and exit orifices and being substantially unobstructed and nonrestricted at and between the entrance and exit orifices;
- first means for coupling the inlet end of the throughbore to a conduit connected to a liquid source; and
- second means for coupling the outlet end of the throughbore to a flow restricting device.

15. The apparatus according to claim 14, wherein the throughbore is an axial throughbore.

16. The apparatus according to claim 14, wherein the opening of said container faces downwardly when using the dispensing apparatus.

* * * * *